United States Patent
Nagatomo et al.

(10) Patent No.: US 10,506,767 B2
(45) Date of Patent: Dec. 17, 2019

(54) INSTALLATION EVALUATION APPARATUS FOR GREENHOUSE, INSOLATION REGULATION APPARATUS FOR GREENHOUSE, AND PROGRAM

(71) Applicant: Panasonic Intellectual Property Management Co., Ltd., Osaka (JP)

(72) Inventors: Shingo Nagatomo, Osaka (JP); Takayoshi Tanizawa, Osaka (JP); Naofumi Kodama, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1085 days.

(21) Appl. No.: 14/787,512

(22) PCT Filed: Mar. 31, 2014

(86) PCT No.: PCT/JP2014/001869
§ 371 (c)(1),
(2) Date: Oct. 28, 2015

(87) PCT Pub. No.: WO2014/184996
PCT Pub. Date: Nov. 20, 2014

(65) Prior Publication Data
US 2016/0066517 A1    Mar. 10, 2016

(30) Foreign Application Priority Data

May 13, 2013  (JP) ................. 2013-101056
Dec. 5, 2013   (JP) ................. 2013-252514

(51) Int. Cl.
*A01G 9/24*    (2006.01)
*G01J 1/00*    (2006.01)

(52) U.S. Cl.
CPC ............... *A01G 9/243* (2013.01); *G01J 1/00* (2013.01)

(58) Field of Classification Search
None
See application file for complete search history.

(56) References Cited

U.S. PATENT DOCUMENTS 4,462,390 A * 7/1984 Holdridge ............. A01G 9/243
                                                              126/587
4,569,150 A * 2/1986 Carlson ..................... A01G 9/18
                                                                47/17

(Continued)

FOREIGN PATENT DOCUMENTS

JP    2003-167065 A    6/2003
JP    2003-242232 A    8/2003

(Continued)

OTHER PUBLICATIONS

Gupta, R., Tiwari, G. N., Kumar, A., & Gupta, Y. (2012). Calculation of total solar fraction for different orientation of greenhouse using 3D-shadow analysis in Auto-CAD. Energy and Buildings, 47, 27-34. (Year: 2012).*

(Continued)

*Primary Examiner* — Bijan Mapar
(74) *Attorney, Agent, or Firm* — Renner, Otto, Boisselle & Sklar, LLP

(57) ABSTRACT

An installation evaluation apparatus 10 for a greenhouse includes an input device 11, an insolation evaluation unit 12, and a presentation device 13. The input device 11 is configured to receive input of position information relating to a planned location for installing the greenhouse. The insolation evaluation unit 12 is configured to determine variation, according to the date and time, in an insolation amount in the planned location by performing a computer simulation using the position information input into the input device 11. The presentation device 13 is configured to visualize and present (Continued)

the variation in the insolation amount according to the date and time, determined by the insolation evaluation unit 12.

20 Claims, 9 Drawing Sheets

(56) References Cited

U.S. PATENT DOCUMENTS

| | | | | |
|---|---|---|---|---|
| 5,818,734 | A * | 10/1998 | Albright | A01G 9/26 700/306 |
| 8,061,080 | B2 * | 11/2011 | Loebl | A01G 9/26 47/58.1 LS |
| 2003/0126791 | A1 * | 7/2003 | Weder | A01G 9/20 47/17 |
| 2005/0252078 | A1 * | 11/2005 | Albright | A01G 7/02 47/58.1 LS |
| 2010/0310116 | A1 | 12/2010 | Sasakawa | |
| 2012/0035887 | A1 * | 2/2012 | Augenbraun | G06T 15/06 703/1 |
| 2012/0150485 | A1 * | 6/2012 | Wang | G01J 1/0219 702/150 |
| 2012/0265350 | A1 * | 10/2012 | Ashdown | H05B 37/00 700/276 |
| 2013/0152462 | A1 * | 6/2013 | Wang | A01G 9/14 47/17 |

FOREIGN PATENT DOCUMENTS

| | | |
|---|---|---|
| JP | 2004-201630 A | 7/2004 |
| JP | 2009-129686 A | 6/2009 |
| JP | 2010-217107 A | 9/2010 |
| WO | WO 2011/158363 A1 | 12/2011 |

OTHER PUBLICATIONS

Fitz-Rodríguez, E., Kubota, C., Giacomelli, G. A., Tignor, M. E., Wilson, S. B., & McMahon, M. (2010). Dynamic modeling and simulation of greenhouse environments under several scenarios: A web-based application. Computers and electronics in agriculture, 70(1), 105-116. (Year: 2010).*

Çakir, U., & Şahin, E. (2015). Using solar greenhouses in cold climates and evaluating optimum type according to sizing, position and location: A case study. Computers and Electronics in Agriculture, 117, 245-257. (Year: 2015).*

Dragićević, S. M. (2011). Determining the Optimum Orientation of a Greenhouse on the Basis of the Total Solar Radiation Availability. Thermal Science, 15(1). (Year: 2011).*

International Search Report for corresponding International Application No. PCT/JP2014/001869 dated Jul. 1, 2014.

Form PCT/ISA/237 for corresponding International Application No. PCT/JP2014/001869 dated Jul. 1, 2014.

* cited by examiner

INSTALLATION EVALUATION APPARATUS FOR GREENHOUSE, INSOLATION REGULATION APPARATUS FOR GREENHOUSE, AND PROGRAM

TECHNICAL FIELD

The present invention relates to an installation evaluation apparatus for a greenhouse, which evaluates an amount of insolation in a planned location for installing the greenhouse, and an insolation regulation apparatus for a greenhouse, which regulates an amount of insolation reaching a crop cultivated in the greenhouse. The present invention also relates to a program for realizing the installation evaluation apparatus for a greenhouse or the insolation regulation apparatus for a greenhouse on a computer.

BACKGROUND ART

It is generally important when constructing a building to take insolation into consideration. For example, when a house is constructed in a country or region positioned on the northern side of the tropic of cancer, such as Japan, a technique of determining a target position of the house from a sun shadow position corresponding to the height of the sun at midday on the winter solstice, using heights of buildings located on adjacent land to the south side as a reference, may be employed conventionally (see JP 2003-167065 A (referred to hereafter as "Document 1"), for example).

Document 1 discloses a technique of determining an integrated sun shadow value by obtaining a sun shadow line formed at each hour in relation to a target site on which a house is to be constructed by a sunlight obstruction located adjacent to the site, and overlapping the sun shadow lines formed over a single day. In the technique described in Document 1, the object is to construct a house, and therefore a number of hours during which the sun shadow lines overlap on the winter solstice, when the solar elevation is lowest, is determined as the integrated sun shadow value.

Incidentally, a greenhouse is installed in order to cultivate a crop, and it is therefore necessary to learn an insolation amount over a period in which the target crop is cultivated. Hence, it is impossible to determine whether or not a planned location in which to install a greenhouse is suitable simply by determining the integrated sun shadow value of a single day.

DISCLOSURE OF THE INVENTION

An object of the present invention is to provide an installation evaluation apparatus for a greenhouse, with which it is possible to determine whether or not a planned location for installing the greenhouse is suitable. A further object of the present invention is to provide an insolation regulation apparatus for a greenhouse, which regulates an amount of insolation reaching a crop cultivated in the greenhouse, and a program for realizing the installation evaluation apparatus for a greenhouse or the insolation regulation apparatus for a greenhouse on a computer.

The installation evaluation apparatus for a greenhouse of an aspect according to the present invention includes an input device into which position information relating to a planned location for installing the greenhouse is input, an insolation evaluation unit that determines variation, according to the date and time, in an insolation amount in the planned location by performing a computer simulation using the position information input into the input device, and a presentation device that visualizes and presents the variation in the insolation amount according to the date and time, determined by the insolation evaluation unit.

In the installation evaluation apparatus for a greenhouse, the input device is preferably configured to receive input of dimensions of the planned location as well as a position and dimensions of an obstruction that exists on a periphery of the planned location and that may therefore form a sun shadow on the planned location, in addition to the position information relating to the planned location, and the insolation evaluation unit is preferably configured to determine the variation, according to the date and time, in the insolation amount in the planned location using the position and the dimensions of the obstruction in addition to the position information.

The installation evaluation apparatus for a greenhouse preferably further includes a disposition setting unit that determines a candidate disposition and candidate dimensions of the greenhouse for obtaining a desired insolation amount using the variation in the insolation amount according to the date and time, determined by the insolation evaluation unit, and the presentation device is preferably configured to visualize and present the candidate disposition and the candidate dimensions of the greenhouse, determined by the disposition setting unit.

In the installation evaluation apparatus for a greenhouse, the disposition setting unit is preferably configured to determine the candidate disposition and the candidate dimensions of the greenhouse based on a type of crop to be cultivated in the greenhouse in addition to the variation in the insolation amount according to the date and time so that a suitable insolation amount for the crop is obtained.

In the installation evaluation apparatus for a greenhouse, the input device is preferably configured to receive also input of the number of greenhouses installed in the planned location, and when the greenhouse is installed in a plurality, the disposition setting unit is preferably configured to determine an interval between the greenhouses automatically.

The installation evaluation apparatus for a greenhouse preferably further includes a region extraction unit that extracts a region, in which the insolation amount satisfies a determination condition, using the variation in the insolation amount according to the date and time, determined by the insolation evaluation unit, and the presentation device is preferably configured to visualize and present the region extracted by the region extraction unit.

In the installation evaluation apparatus for a greenhouse, the region extraction unit preferably includes an integration unit that determines an integrated value of the insolation amount in the planned location over a specific period, and a determination unit that extracts a region serving as a candidate installation location of a sensor that monitors an environment of the greenhouse using the determination condition, the determination condition being satisfied when the integrated value is within a reference range set in order to extract the installation location of the sensor.

In the installation evaluation apparatus for a greenhouse, the determination unit is preferably configured to determine the reference range based on the insolation amount.

In the installation evaluation apparatus for a greenhouse, during a season in which the insolation amount equals or exceeds a preset upper limit value, the determination unit is preferably configured to set a range equaling or exceeding a representative value determined from the integrated value in the planned location as the reference range.

In the installation evaluation apparatus for a greenhouse, during a season in which the insolation amount is equal to or smaller than a preset lower limit value, the determination unit is preferably configured to set a range not lower than a representative value determined from the integrated value in the planned location as the reference range.

In the installation evaluation apparatus, the sensor preferably includes at least one type of sensor selected from a group including a temperature sensor, a humidity sensor, and a soil moisture sensor.

In the installation evaluation apparatus for a greenhouse, the region extraction unit preferably includes an integration unit that determines an integrated value of the insolation amount in the planned location over a specific period, and a determination unit that extracts a region serving as a candidate installation location of a sensor that monitors an external environment of the greenhouse in the planned location using the determination condition, the determination condition being satisfied when the integrated value is within a reference range set in order to extract the installation location of the sensor.

In the installation evaluation apparatus for a greenhouse, during a season in which the insolation amount equals or exceeds a preset upper limit value, the determination unit is preferably configured to set a range equaling or exceeding a representative value determined from the integrated value in the planned location as the reference range.

In the installation evaluation apparatus for a greenhouse, the sensor preferably includes an illuminance sensor or a solar radiation sensor.

An insolation regulation apparatus for a greenhouse of an aspect according to the present invention includes an input device into which position information relating to a planned location for installing the greenhouse is input, an insolation evaluation unit that determines variation, according to the date and time, in an insolation amount in the planned location by performing a computer simulation using the position information input into the input device, and a control device that controls an operation of an environment regulation device that regulates a cultivation environment of a crop in the greenhouse. The control device is configured to determine control content for obtaining a suitable insolation amount for cultivating the crop using the variation in the insolation amount according to the date and time, determined by the insolation evaluation unit.

In the insolation regulation apparatus for a greenhouse, the input device is preferably configured to receive input of dimensions of the planned location as well as a position and dimensions of an obstruction that exists on a periphery of the planned location and that may therefore form a sun shadow on the planned location, in addition to the position information relating to the planned location, and the insolation evaluation unit is preferably configured to determine the variation, according to the date and time, in the insolation amount in the planned location using the position and the dimensions of the obstruction in addition to the position information.

In the insolation regulation apparatus for a greenhouse, the environment regulation device preferably includes a curtain capable of moving between a first position in which an amount of external light emitted onto the crop is reduced and a second position in which the amount of external light emitted onto the crop is not reduced, and a driving device for moving the curtain, and the control device is preferably configured to notify the driving device of a timing at which the curtain moves to the first position and a timing at which the curtain moves to the second position.

In the insolation regulation apparatus for a greenhouse, the curtain preferably includes a roof curtain provided on a roof of the greenhouse, and the control device is preferably configured to instruct the driving device to move the roof curtain to the first position during a season in which a time between sunrise and sunset equals or exceeds a predetermined reference time.

In the insolation regulation apparatus for a greenhouse, the environment regulation device preferably includes a first window provided on an east-side side wall of the greenhouse and a second window provided on a west-side side wall of the greenhouse, and an opening/closing device that drives the first window and the second window between an open position and a closed position, and the curtain preferably includes a first side curtain provided on the east-side side wall of the greenhouse and a second side curtain provided on the west-side side wall of the greenhouse.

In the insolation regulation apparatus for a greenhouse, the control device is preferably configured to: instruct the opening/closing device to move the first window and the second window to the open position in summer; instruct the driving device to move the first side curtain to the first position and move the second side curtain to the second position in a time slot prior to culmination and where a solar elevation is equal to or lower than a first reference angle; instruct the driving device to move the first side curtain to the second position and move the second side curtain to the first position in a time slot following culmination and where the solar elevation is equal to or lower than a second reference angle; and instruct the driving device to move both the first side curtain and the second side curtain to the first position in a time slot where the solar elevation is between the first reference angle and the second reference angle.

In the insolation regulation apparatus for a greenhouse, the control device is preferably configured to: instruct the opening/closing device to move the first window and the second window to the closed position in winter; instruct the driving device to move the first side curtain to the second position and move the second side curtain to the first position in a time slot prior to culmination and where the solar elevation is equal to or lower than a third reference angle; and instruct the driving device to move the first side curtain to the first position and move the second side curtain to the second position in a time slot following culmination and where the solar elevation is equal to or lower than a fourth reference angle.

A program of an aspect according to the present invention causes a computer to function as an installation evaluation apparatus for a greenhouse, the installation evaluation apparatus including an input device into which position information relating to a planned location for installing the greenhouse is input, an insolation evaluation unit that determines variation, according to the date and time, in an insolation amount in the planned location by performing a computer simulation using the position information input into the input device, and a presentation device that visualizes and presents the variation in the insolation amount according to the date and time, determined by the insolation evaluation unit.

Another program of an aspect according to the present invention causes a computer to function as an insolation regulation apparatus for a greenhouse, the insolation regulation apparatus including an input device into which position information relating to a planned location for installing the greenhouse is input, an insolation evaluation unit that determines variation, according to the date and time, in an insolation amount in the planned location by performing a computer simulation using the position information input into the input device, and a control device that controls an operation of an environment regulation device that regulates a cultivation environment of a crop in the greenhouse. The control device is configured to determine control content for obtaining a suitable insolation amount for cultivating the crop using the variation in the insolation amount according to the date and time, determined by the insolation evaluation unit. Furthermore, the aspect according to the present invention is not limited to a program, and may also be a computer-readable storage medium storing the program.

According to these configurations of the aspects according to the present invention, the variation according to the date and time in the insolation amount in the planned location for installing the greenhouse is visualized and presented, making it possible to determine whether or not the planned location for installing the greenhouse is suitable.

BRIEF DESCRIPTION OF THE DRAWINGS

Preferred embodiments of the present invention will be described in further detail below. Other features and advantages of the present invention will be understood more fully by referring to the following detailed description and the attached drawings.

DESCRIPTION OF EMBODIMENTS (Basic Configuration)

Figure 1:
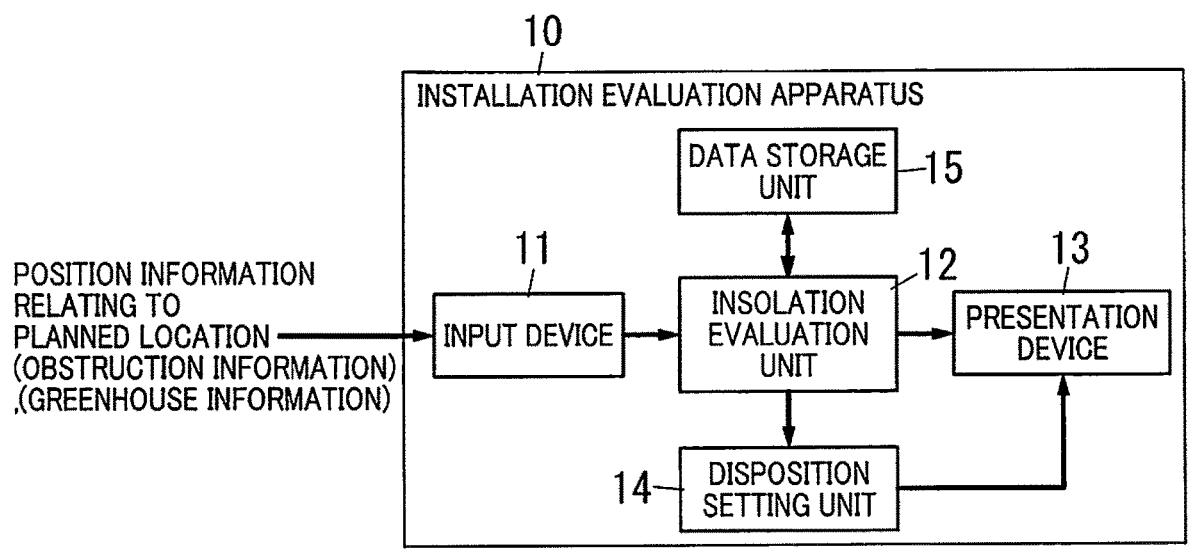
FIG. 1 is a block diagram showing a first embodiment.
Figure 2A:
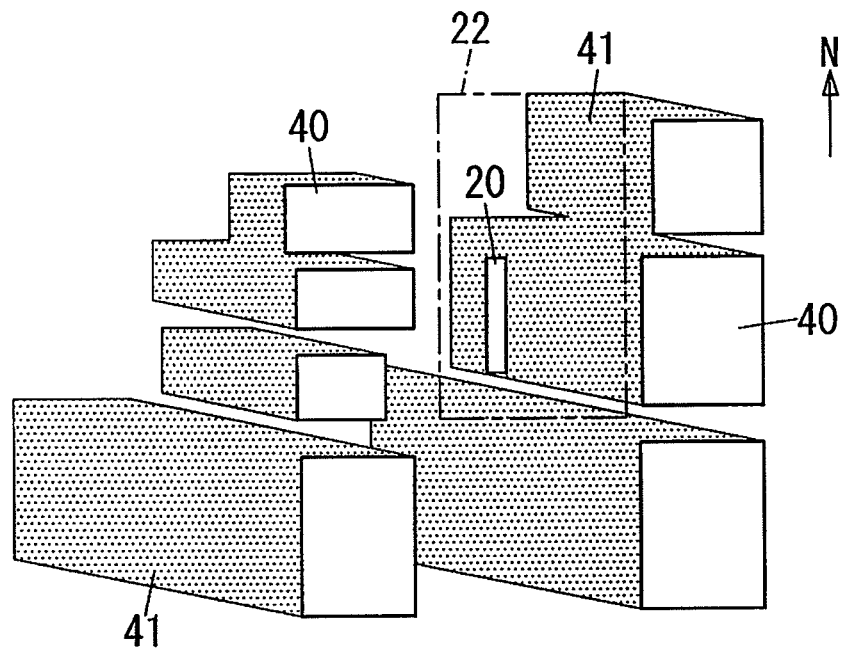
FIGS. 2A and 2B are views showing examples of sun shadow formation by an obstruction, according to the first embodiment.
Figure 2B:
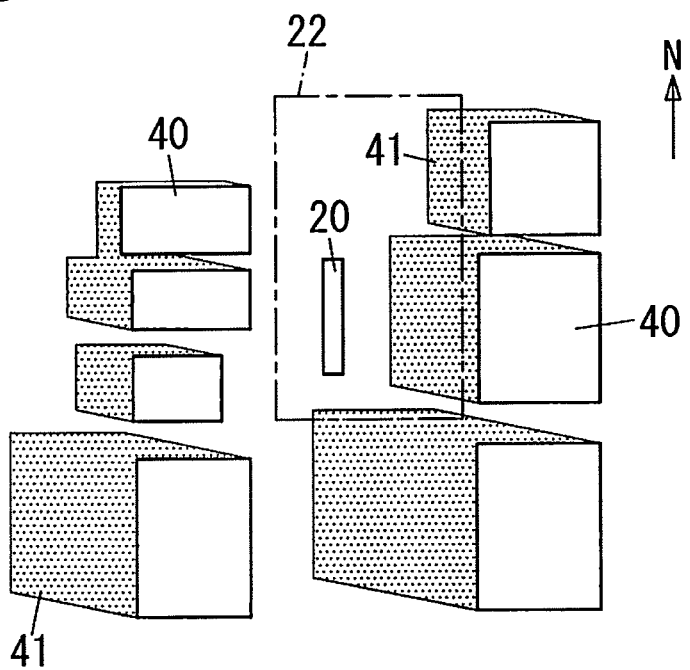

As shown in FIGS. 1, 2A, and 2B, an installation evaluation apparatus 10 for a greenhouse to be described below includes an input device 11, an insolation evaluation unit 12, and a presentation device 13. The input device 11 is configured to receive input of position information relating to a planned location 22 for installing a greenhouse 20. The insolation evaluation unit 12 is configured to determine variation, according to the date and time, in an insolation amount in the planned location 22 by performing a computer simulation using the position information input from the input device 11. The presentation device 13 is configured to visualize and present the variation in the insolation amount according to the date and time, determined by the insolation evaluation unit 12.

The input device 11 is preferably configured to receive input of dimensions of the planned location 22 as well as a position and dimensions of an obstruction 40 that exists on the periphery of the planned location 22 and that may therefore form a sun shadow 41 on the planned location 22, in addition to the position information relating to the planned location 22. In this case, the insolation evaluation unit 12 is configured to determine the variation, according to the date and time, in the insolation amount in the planned location 22 using the position and dimensions of the obstruction 40 in addition to the position information.

The installation evaluation apparatus 10 preferably includes a disposition setting unit 14 that determines a candidate disposition and candidate dimensions of the greenhouse 20 for obtaining a desired insolation amount using the variation in the insolation amount according to the date and time, determined by the insolation evaluation unit 12. In this case, the presentation device 13 is configured to visualize and present the candidate disposition and the candidate dimensions of the greenhouse, determined by the disposition setting unit 14.

The disposition setting unit 14 is preferably configured to determine the candidate disposition and the candidate dimensions of the greenhouse 20 based on a type of crop to be cultivated in the greenhouse 20 in addition to the variation in the insolation amount according to the date and time so that a suitable amount of insolation for the crop is obtained.

Further, the input device 11 is preferably configured to receive input of the number of greenhouses 20 installed in the planned location 22. In this case, when the greenhouse 20 is installed in a plurality, the disposition setting unit 14 is preferably configured to determine an interval between the greenhouses 20 automatically.

Furthermore, the installation evaluation apparatus 10 preferably includes a region extraction unit 16 that extracts a region in which the insolation amount satisfies a determination condition using the variation in the insolation amount according to the date and time, determined by the insolation evaluation unit 12. In this case, the presentation device 13 is configured to visualize and present the region extracted by the region extraction unit 16.

The region extraction unit 16 preferably includes an integration unit 161 and a determination unit 162. The integration unit 161 is configured to determine an integrated value of the insolation amount in the planned location 22 over a specific period. Further, the determination unit 162 is configured to extract a region serving as a candidate installation location of a sensor 55 that monitors an environment of the greenhouse 20 using the determination condition, the determination condition being satisfied when the integrated value is within a reference range set in order to extract the installation location of the sensor 55.

The determination unit 162 is preferably configured to determine the reference range on the basis of the insolation amount. In this case, during a season in which the insolation amount equals or exceeds a preset upper limit value, the determination unit 162 is preferably configured to set a range equaling or exceeding a representative value determined from the integrated value in the planned location 22 as the reference range. During a season in which the insolation amount is equal to or smaller than a preset lower limit value, on the other hand, the determination unit 162 is preferably configured to set a range no lower than a representative value determined from the integrated value in the planned location 22 as the reference range. The former season corresponds to summer in the northern hemisphere, and the latter season corresponds to winter in the northern hemisphere.

The sensor 55 preferably includes at least one type of sensor selected from a group including a temperature sensor, a humidity sensor, and a soil moisture sensor.

Alternatively, the determination unit 162 may be configured to extract a region serving as a candidate installation location of a sensor 55 that monitors an external environment of the greenhouse 20 in the planned location 22 using a reference range set in order to extract the installation location of the sensor 55 as a determination condition. This technique is employed when a plurality of greenhouses 20 (approximately ten greenhouses 20, for example) are provided in the planned location 22 in order to determine the installation location of a single sensor 55 that is shared by the plurality of greenhouses 20.

In this case, the determination unit 162 is preferably configured to set a range equaling or exceeding a representative value determined from the integrated value in the planned location 22 as the reference range during the season in which the amount of insolation equals or exceeds the preset upper limit value. The sensor 55 preferably includes an illuminance sensor or a solar radiation sensor.

Figure 6:
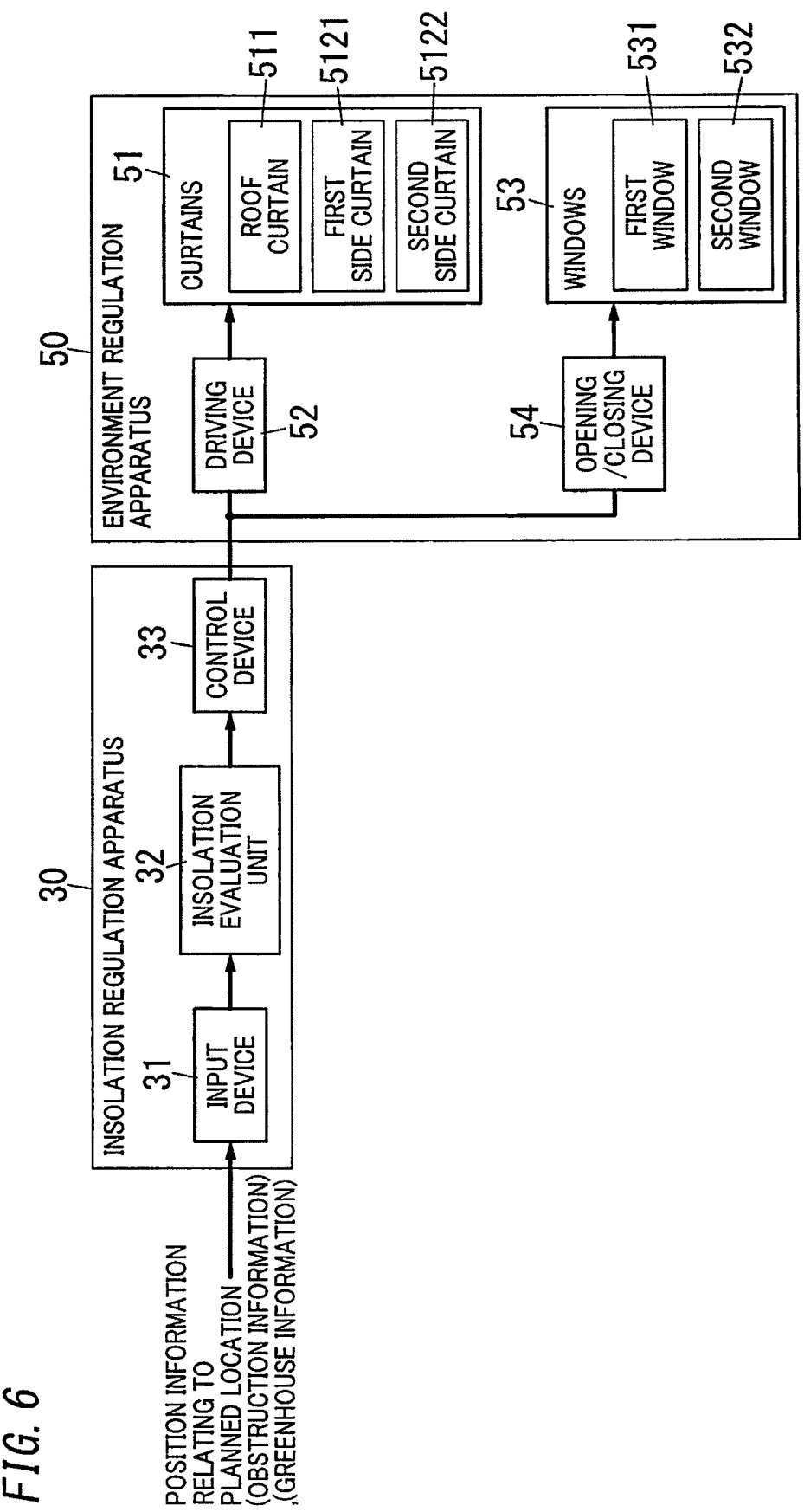
FIG. 6 is a block diagram showing a second embodiment.

Further, as shown in FIG. 6, an insolation regulation apparatus 30 for a greenhouse, to be described below, includes an input device 31, an insolation evaluation unit 32, and a control device 33. The input device 31 is configured to receive input of position information relating to the planned location 22 for installing the greenhouse. The insolation evaluation unit 32 is configured to determine variation, according to the date and time, in the insolation amount in the planned location 22 by performing a computer simulation using the position information input from the input device 31. The control device 33 is configured to control an operation of an environment regulation device 50 that regulates a cultivation environment of the crop in the greenhouse 20. Further, the control device 33 is configured to determine control content for obtaining a suitable insolation amount for cultivating the crop using the variation in the insolation amount according to the date and time, determined by the insolation evaluation unit 32.

The input device 31 is configured to receive input of the dimensions of the planned location 22 as well as the position and dimensions of the obstruction 40 that exists on the periphery of the planned location 22 and that may therefore form the sun shadow 41 on the planned location 22, addition to the position information relating to the planned location 22. The insolation evaluation unit 32 is preferably configured to determine the variation, according to the date and time, in the insolation amount in the planned location 22 using the position and dimensions of the obstruction 40 in addition to the position information.

The environment regulation device 50 includes a curtain 51 capable of moving between a first position in which an amount of external light emitted onto the crop is reduced and a second position in which the amount of external light emitted onto the crop is not reduced, and a driving device 52 for moving the curtain 51. The control device 33 is configured to notify the driving device 52 of a timing at which to move the curtain 51 to the first position and a timing at which to move the curtain 51 to the second position.

As shown in FIGS. 7A to 7C, 8A, and 8B, the curtain 51 preferably includes a roof curtain 511 provided on a roof 21 of the greenhouse 20. During a season in which the time between sunrise and sunset equals or exceeds a predetermined reference time, the control device 33 is preferably configured to instruct the driving device 52 to move the roof curtain 511 to the first position.

The environment regulation device 50 includes a first window 531 provided on an east-side side wall 23A of the greenhouse 20, a second window 532 provided on a west-side side wall 23B of the greenhouse 20, and an opening/closing device 54 that drives the first window 531 and the second window 532 between an open position and a closed position. The curtain 51 preferably includes a first side curtain 5121 provided on the east-side side wall 23A of the greenhouse 20, and a second side curtain 5122 provided on the west-side side wall 23B of the greenhouse 20.

In summer, the control device 33 is configured to instruct the opening/closing device 54 to move the first window 531 and the second window 532 to the open position. Moreover, the control device 33 is configured to instruct the driving device 52 to move the first side curtain 5121 and the second side curtain 5122 to following positions in accordance with the solar elevation. In a time slot prior to culmination and where the solar elevation is equal to or lower than a first reference angle, the first side curtain 5121 is preferably in the first position and the second side curtain 5122 is preferably in the second position. Further, in a time slot following culmination and where the solar elevation is equal to or lower than a second reference angle, the first side curtain 5121 is preferably in the second position and the second side curtain 5122 is preferably in the first position. Furthermore, in a time slot where the solar elevation is between the first reference angle and the second reference angle, the first side curtain 5121 and the second side curtain 5122 are both preferably in the first position.

In winter, the control device 33 is configured to instruct the opening/closing device 54 to move the first window 531 and the second window 532 to the closed position. Moreover, the control device 33 is configured to instruct the driving device 52 to move the first side curtain 5121 and the second side curtain 5122 to following positions in accordance with the solar elevation. In a time slot prior to culmination and where the solar elevation is equal to or lower than a third reference angle, the first side curtain 5121 is preferably in the second position and the second side curtain 5122 is preferably in the first position. In a time slot following culmination and where the solar elevation is equal to or lower than a fourth reference angle, the first side curtain 5121 is preferably in the first position and the second side curtain 5122 is preferably in the second position.

A program to be described below causes a computer to function as the installation evaluation apparatus 10 for a greenhouse, which includes the input device 11, the insolation evaluation unit 12, and the presentation device 13.

Further, another program to be described below causes a computer to function as the insolation regulation apparatus 30 for a greenhouse, which includes the input device 31, the insolation evaluation unit 32, and the control device 33.

First Embodiment)

As shown in FIG. 1, the installation evaluation apparatus 10 includes the input device 11, the insolation evaluation unit 12, the presentation device 13, the disposition setting unit 14, and a data storage unit 15. The installation evaluation apparatus 10 is realized by executing a program on a general-purpose computer. Note, however, that the installation evaluation apparatus 10 may be a dedicated apparatus. The program is provided via an electric communication line such as the Internet, or by a computer-readable storage medium.

In the illustrated example, the input device 11 and the presentation device 13 are provided integrally with the installation evaluation apparatus 10. However, the input device 11 and the presentation device 13 may be provided separately to the other constituent elements. For example, the input device 11 and the presentation device 13 may be terminal devices as other computer devices that are connected to an electric communication line so that the other constituent elements can communicate with the terminal devices. The terminal devices may be selected from laptop personal computers, smartphones, tablet terminals, and so on. Further, the computer devices may be selected from Web servers, cloud computing systems, and so on.

The installation evaluation apparatus 10 is used to determine whether or not an amount of insolation required by the crop cultivated using the greenhouse 20 (see FIGS. 2A and 2B) can be secured in the planned location 22 for installing the greenhouse 20. For this purpose, information input into the input device 11 includes the position information relating to the planned location 22. The input device 11 includes a display on which an input field for inputting the position information is displayed, and operating keys for inputting characters into the input field. The operating keys may be selected from a keyboard provided independently of the display, a touch panel superimposed onto a screen of the display, and so on, for example.

Note that there are no particular limitations on the type of crop to be cultivated, but in the embodiment described below, a soft vegetable such as spinach, komatsuna, or mizuna is envisaged. In the greenhouse 20 used to cultivate this type of crop, daytime temperature increases must be suppressed in summer and nighttime temperature reductions must be suppressed in winter.

The position information relating to the planned location 22 is information required to estimate an amount of insolation reaching a surface of plowed soil in which the crop is cultivated, and since it is sufficient to know the position relative to the sun, a distance error of approximately several tens of km on the surface of the earth is permitted. Hence, the position information relating to the planned location 22 is specified by longitude and latitude at a precision of approximately 0.1 degrees. In this case, the distance error is approximately 10 km.

The position information relating to the planned location 22 may be actually measured to this degree of precision using a positioning device that employs a GPS (Global Positioning System). In particular, when a mobile terminal having an inbuilt GPS function, such as a smartphone or a tablet terminal, is used as the input device 11, the GPS function built into the mobile terminal can be operated in conjunction with the installation evaluation apparatus 10, and as a result, labor expended to input the position information can be eliminated.

Furthermore, the position information relating to the planned location 22 may be determined from a map instead of being actually measured. By specifying the position of the planned location 22 on map data published on the Internet, for example, the longitude and latitude can be obtained with a sufficient degree of precision. When the longitude and latitude can be obtained by specifying the position of the planned location 22 on map data in this manner, longitude and latitude data obtained by specifying the position may be used by the installation evaluation apparatus 10.

Hence, a user interface for inputting the position information into the input device 11 is not necessarily limited to a combination of an input field and operating keys, and may take various configurations.

The insolation evaluation unit 12 determines variation, according to the date and time, in the insolation amount in the planned location 22 by performing a computer simulation using the position information relating to the planned location 22, which is input into the input device 11. When the longitude and latitude of the planned location 22 and the date and time are already known, an azimuth and an elevation (a height) of the sun are determined by performing a simple interpolation calculation using known data associating these elements. Moreover, the azimuth and elevation of the sun do not have to be determined with a high degree of precision, and therefore the precision of the data associating the latitude and longitude, the date and time, and the azimuth and elevation of the sun may be low, leading to a comparative reduction in the amount of data. The data are stored in the data storage unit 15.

Hence, the insolation evaluation unit 12 calculates the azimuth and elevation of the sun in accordance with the date and time using the position information input into the input device 11 and the data stored in the data storage unit 15. The greenhouse 20 is used to cultivate a crop, and therefore the insolation amount over the period in which the crop is cultivated must be evaluated. Accordingly, the insolation evaluation unit 12 determines the azimuth and elevation of the sun at all dates and times included in a predetermined period specified using the input device 11, or all dates and times over a single year, rather than determining the azimuth and elevation of the sun at a specific date and time. Note that it is sufficient, from a practical standpoint, to determine the azimuth and elevation of the sun at time intervals of approximately ten minutes to one hour.

As described above, when the azimuth and elevation of the sun at each date and time is determined at predetermined time intervals, an amount of sunlight (an amount of insolation) at each date and time can be estimated. It is assumed here for the sake of simplicity that an amount of luminous flux per unit surface area that reaches Earth after being emitted from the sun is constant throughout the year. The amount of luminous flux per unit surface area that reaches the surface of the plowed soil in which the crop is cultivated varies according to an angle formed between the surface of the plowed soil and the sun. The insolation amount per unit time is therefore larger in summer than in winter.

The amount of insolation required to cultivate the crop to be cultivated in the greenhouse 20 is known in advance, and therefore the insolation evaluation unit 12 determines whether or not the amount of insolation (an integrated value) required by the crop is obtained in the planned location 22. The amount of insolation required by the crop to be cultivated in the greenhouse 20 is preferably stored in advance in the data storage unit 15.

At least one of the data associating the longitude and latitude, the date and time, and the azimuth and elevation of the sun and data associating the crop and the insolation amount may be stored on a separate computer device that communicates with the installation evaluation apparatus 10 over an electric communication line rather than in the data storage unit 15. In other words, a computer server, a cloud computing system, or the like may be used in place of the data storage unit 15.

After determining the insolation amount at predetermined time intervals over a predetermine period (a period specified using the input device 11, for example one year), the insolation evaluation unit 12 determines whether or not the amount of insolation required by the crop to be cultivated is obtained over the predetermined period, and outputs a determination result to the presentation device 13.

The insolation evaluation unit 12 may have a function for outputting the variation over time in the insolation amount to the presentation device 13 without determining whether or not the required insolation amount is obtained. In other words, the variation in the insolation amount may be presented visually by the presentation device 13 in relation to the planned location 22 for installing the greenhouse 20. To put it another way, the insolation evaluation unit 12 generates at least one of data used by the presentation device 13 to present variation in the insolation amount determined at predetermined time intervals in the form of a moving image, and data used by the presentation device 13 to present variation in the integrated value of the insolation amount over a period specified by the input device 11 in the form of a moving image.

As described above, the presentation device 13 presents the amount of insolation in the planned location 22, and therefore a user can easily make decisions relating to installation of the greenhouse 20 on the basis of the information presented by the presentation device 13. Here, the decisions include content relating to specifications of the greenhouse 20, the disposition of the greenhouse 20 and so on.

Incidentally, as shown in FIGS. 2A and 2B, the insolation amount in the planned location 22 for installing the greenhouse 20 also varies according to the sun shadow 41. Therefore, when the obstruction 40 that may form the sun shadow 41, such as a building or a tree, exists on the periphery of the planned location 22, the insolation evaluation unit 12 estimates the insolation amount in consideration of the sun shadow 41 formed by the obstruction 40. The sun shadow 41 is affected not only by the obstruction 40 existing on the periphery of the planned location 22, but also geographical features on the periphery of the planned location 22. With the exception of mountains and valleys that are more likely to form the sun shadow 41, however, the effect of the sun shadow 41 formed by geographical features may normally be ignored. Note that FIGS. 2A and 2B show conditions occurring around the beginning of spring, FIG. 2A showing an example of the sun shadow 41 at 7:00 and FIG. 2B showing an example of the sun shadow 41 at 8:00.

When the effect of the sun shadow 41 formed by the obstruction 40 is taken into account, the position (a relative position relative to the planned location 22) and the dimensions of the obstruction 40 are input into the input device 11. The dimensions of the planned location 22 are also input into the input device 11. The input device 11 includes a display and operating keys. The display displays an input field for inputting the position and dimensions of the obstruction 40 and an input field for inputting the dimensions of the planned location 22, while the operating keys are used to input characters into the input fields.

The sun shadow 41 formed by the obstruction 40 is determined by performing a simulation that takes into account the azimuth and elevation of the sun. In this embodiment, a shape of the obstruction 40 is simplified to a rectangular parallelepiped shape in order to simplify the simulation. Further, an obstruction such as a thicket is handled in its entirety as a single obstruction 40 and therefore represented by a single rectangular parallelepiped. The position of the obstruction 40 is expressed as a bearing and a distance relative to the planned location 22, and the dimensions of the obstructions 40 are expressed by height, width, and depth. Furthermore, the shape of the planned location 22 is simplified to a rectangular shape, and the dimensions of the planned location 22 are expressed by the length of each side of the rectangle.

The dimensions of the obstruction 40 may be obtained by actually measuring the obstruction 40, but actual measurement requires a measurement device and takes time, and is not therefore in keeping with the aim of evaluating the insolation amount in the planned location 22 simply. Preferably, therefore, either the dimensions of the obstruction 40 are estimated using photographs of the obstruction 40, or the dimensions of the sun shadow 41 formed by the obstruction 40 are measured and the dimensions of the obstruction 40 are estimated from the azimuth and elevation of the sun at the date and time of the measurement. These simply determined dimensions of the obstruction 40 are not highly precise, but are precise enough to be used to estimate the insolation amount in a simplified manner. Further, the position of the obstruction 40 relative to the planned location 22 can be determined simply using map data published on the Internet.

When the variation in the insolation amount is presented after taking into account the effect of the sun shadow 41 formed by the obstruction 40, the user can easily make decisions relating to installation of the greenhouse 20 in the planned location 22. Note that an appropriate reference value may be determined in relation to the insolation amount, whereupon the specifications and disposition of the greenhouse 20 may be set automatically in accordance with appropriate rules so that an insolation amount equaling or exceeding the reference value is obtained. In this case, variation in the insolation amount due to weather conditions is preferably taken into account. When the effect of the weather conditions on the insolation amount is taken into account, the insolation amount may be corrected on the basis of past meteorological data relating to the planned location 22.

As described above, by having the insolation evaluation unit 12 determine the variation, according to the date and time, in the insolation amount, a determination can be made as to whether or not to install the greenhouse 20 in the planned location 22. Since unevenness occurs in the insolation amount even within the planned location 22, however, the disposition of the greenhouse 20 must be taken into account in order to obtain an appropriate insolation amount. Moreover, the shape and dimensions of the greenhouse 20 must be set in accordance with a yield of the target crop.

Figure 3:
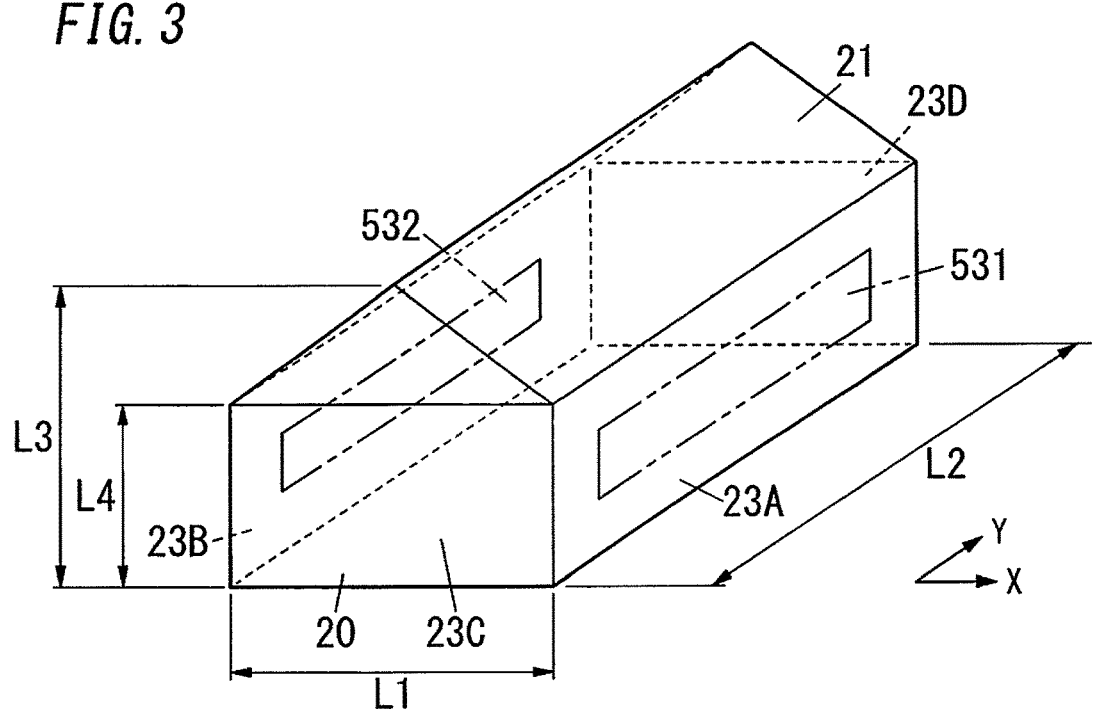
FIG. 3 is a perspective view showing an outer appearance of a greenhouse used in the first embodiment.

As shown in FIG. 3, the greenhouse 20 according to this embodiment is formed from four side walls 23A to 23D (more specifically, the east-side side wall 23A, the west-side side wall 23B, a south-side side wall 23C, and a north-side side wall 23D) combined such that sites thereof standing on the ground form a rectangular shape, while the roof 21, which has a triangular cross-section and is formed by abutting two inclined planes, is placed on top of the side walls 23A to 23D. In other words, the roof 21 is formed in the shape of a gabled roof. Note, however, that this is merely an example of the shape of the roof 21, and the roof 21 may take a shape having a semicircular cross-section or the like, for example.

Hereafter, a direction linking gable walls of the greenhouse 20 will be referred to as a long axis direction, and an orthogonal direction to the long axis direction in a parallel plane to the ground will be referred to as a short axis direction. An entrance/exit door (not shown) is provided in a gable wall of the greenhouse 20. Further, windows 53 are formed respectively in the two side walls 23A and 23B forming respective short axis direction ends of the greenhouse 20. Hereafter, one of the windows 53 will be referred to as the first window 531, and the other will be referred to as the second window 532.

As a rule, the greenhouse 20 is disposed such that the long axis direction is in alignment with a north-south direction. Note, however, that as long as an angle formed by the long axis direction and the north-south direction is comparatively small (no more than thirty degrees, for example), the long axis direction does not necessarily have to be in alignment with the north-south direction. For example, when the obstruction 40 such as a thicket that forms the sun shadow 41 in the planned location 22 exists and the obstruction 40 is not disposed in alignment with the north-south direction, the long axis direction of the greenhouse 20 may be aligned with the obstruction 40 so that the overall insolation amount received by the greenhouse 20 is averaged.

In other words, the disposition of the greenhouse 20 is preferably determined so as to reduce unevenness in the amount of insolation reaching the surface of the plowed soil in the greenhouse 20 within the planned location 22 for installing the greenhouse 20. For this purpose, the installation evaluation apparatus 10 preferably includes the disposition setting unit 14 for determining the disposition and dimensions of the greenhouse 20 in the planned location 22. The disposition setting unit 14 extracts a region of the planned location 22 in which the desired insolation amount is obtained using the variation in the insolation amount according to the date and time, determined by the insolation evaluation unit 12, and determines the dimensions and disposition of the greenhouse 20 that can be disposed in this region. The disposition of the greenhouse 20 includes a dimension of the long axis direction, a dimension of the short axis direction, and the angle of the long axis direction relative to the north-south direction.

The insolation amount used by the disposition setting unit 14 may be determined appropriately by the user using the input device 11, but is preferably determined in accordance with the type of crop to be cultivated so that a suitable insolation amount for the crop is obtained. Accordingly, the disposition setting unit 14 determines a candidate disposition and candidate dimensions of the greenhouse 20 based on the type of crop to be cultivated in the greenhouse 20 so that a suitable insolation amount for the crop is obtained. The candidate disposition and candidate dimensions of the greenhouse 20 determined by the disposition setting unit 14 are then presented visually by the presentation device 13.

When a surface area of the planned location 22 is considerably larger than a footprint of a single greenhouse 20, or when a plurality of types of crops are to be cultivated, a plurality of greenhouses 20 may be disposed. Accordingly, the input device 11 preferably includes an input field for inputting the number of greenhouses 20 to be disposed in the planned location 22.

Figure 4:
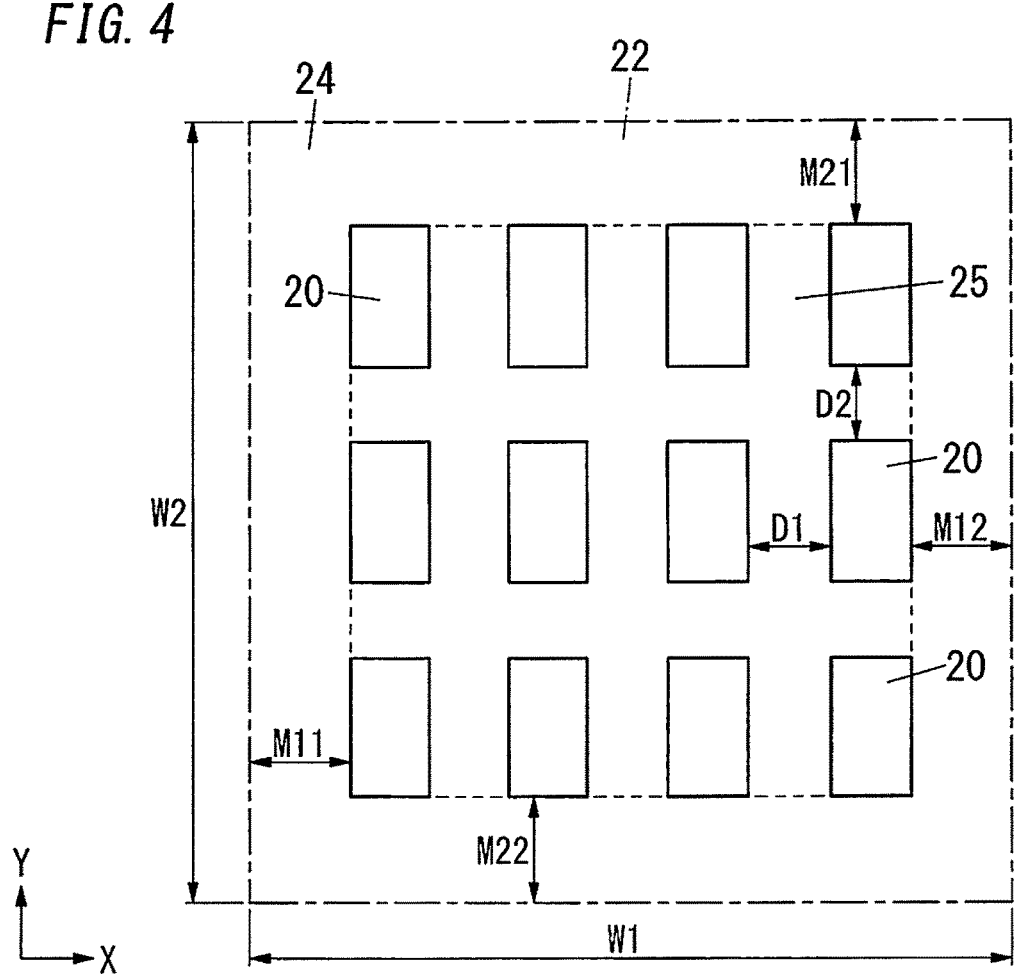
FIG. 4 is a view showing an example arrangement of a plurality of greenhouses according to the first embodiment.

When a plurality of greenhouses 20 are disposed in the planned location 22, as shown in FIG. 4, it is assumed that the greenhouses 20 are arranged at equal intervals in alignment with respective sides of the planned location 22. Further, the greenhouses 20 are disposed so that a margin 24 remains in a peripheral portion of the planned location 22, and so that a gap 25 is formed between adjacent greenhouses 20. Hereafter, an X direction and a Y direction are defined in accordance with directions shown in FIG. 4. In the example in the drawing, the short axis direction and the long axis direction of the greenhouse 20 are defined respectively as the X direction and the Y direction. When a plurality of greenhouses 20 are disposed in the planned location 22, a number of greenhouses n1 in the X direction and a number of greenhouses n2 in the Y direction are specified. The input device 11 preferably includes input fields into which X direction and Y direction dimensions can be input in relation to the planned location 22, the margin 24, and the gap 25. In other words, the input device 11 preferably includes input fields for inputting X direction and Y direction dimensions W1, W2 of the planned location 22, X direction dimensions M11, M12 and Y direction dimensions M21, M22 of the margin 24, and X direction and Y direction dimensions D1, D2 of the gap 25.

Note that the dimensions of the margin 24 are determined on all four sides of the planned location 22. Assuming that an upward orientation of the greenhouses 20 shown in FIG. 4 is a northward orientation, the dimensions M11, M12, M21, and M22 correspond respectively to dimensions of the margin 24 on the west side, the east side, the north side, and the south side. The orientation used in this example is set merely to facilitate understanding, and this embodiment is not limited thereto. The orientation of the greenhouse 20 may be set as appropriate, for example such that the upward orientation of the greenhouse 20 is inclined eastward relative to the northward orientation or the like.

Incidentally, when the plurality of greenhouses 20 are provided adjacent to each other, the insolation amount may vary according to sun shadows 43 formed by the greenhouses 20. Therefore, the dimensions of the greenhouse 20 (an X direction dimension L1, a Y direction dimension L2, an overall height L3, and a height L4 excluding the roof 21) are also input into the input device 11 (see FIG. 3). Accordingly, the input device 11 includes an input field for inputting the various dimensions and the number of greenhouses 20 as information relating to the greenhouse 20.

Of the parameters applied to the input device 11, the dimensions W1, W2 of the planned location 22 and the dimensions L1 to L4 relating to the specifications of the greenhouse 20 are essential. Other parameters such as the numbers n1, n2 of greenhouses 20 and the dimensions M11, M12, M21, M22, D1, D2 can be calculated automatically by providing a part of the parameters. Hence, the parameters input into the input device 11 may be partially omitted.

For example, when the numbers n1, n2, the dimensions M11, M21 of the margin 24, and the dimensions D1, D2 of the gap 25 are specified, the dimensions M12, M22 of the margin 24 are set automatically.

With regard to the X direction, the dimension W1 of the planned location 22 is expressed by the relational expression W1=M11+M12+n1×L1+(n1−1)×D1. The unknown quantity in this relational expression, i.e. the dimension M12 of the margin 24, is determined as M12=W1−{n1×(L1+D1)−D1}−M11.

Further, with regard to the Y direction, the dimension W2 of the planned location 22 is expressed by the relational expression W2=M21+M22+n2×L2+(n2−1)×D2. The unknown quantity in this relational expression, i.e. the dimension M22 of the margin 24, is determined as M22=W2−{n2×(L2+D2)−D2}−M21.

Similarly, when the dimensions M11, M12, M21, M22 of the margin 24 and the numbers n1, n2 are specified, the unknown quantities, i.e. the dimensions D1, D2 of the gap 25, are expressed respectively as D1={W1−(M11+M12)−n1×L1}/(n1−1) and D2={W2−(M21+M22)−n2×L2}/(n2−1).

Furthermore, the dimensions D1, D2 of the gap 25 may be specified alone. In this case, the dimensions M11, M12, M21, M22 of the margin 24 are unknown quantities, while a dimension (M11+M12) and a dimension (M21+M22) are determined directly from the relational expression. Here, when M11=M12 and M21=M22 are used as constraints, the dimensions M11, M12, M21, M22 are determined by respectively halving the determined dimensions (M11+M12) and (M21+M22). Note that the determined dimensions (M11+M12) and (M21+M22) do not have to be halved, and may be divided in appropriate proportions.

When a plurality of greenhouses 20 are disposed, as described above, the insolation evaluation unit 12 also evaluates an effect of the adjacent greenhouse 20 on the insolation amount.

For example, when light transmitted through the adjacent greenhouse 20 is emitted onto the surface of the plowed soil, the insolation amount is corrected in consideration of a transmittance of a covering material used in the greenhouse 20. The transmittance of the covering material is 80%, for example.

Figure 7A:
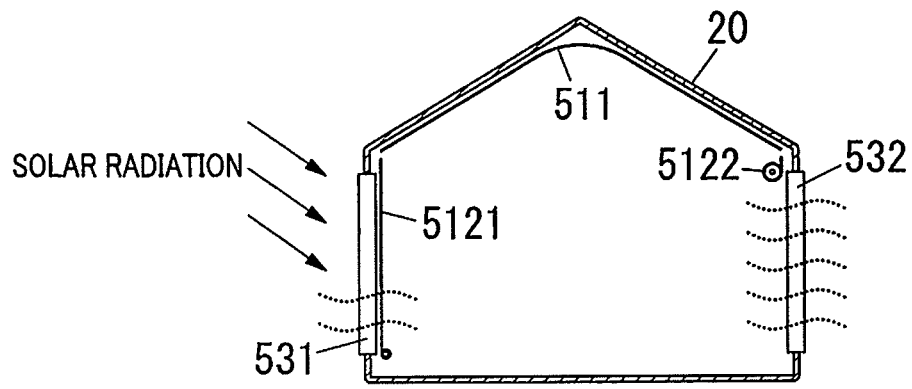
FIGS. 7A to 7C are views showing an example operation of the second embodiment.
Figure 7B:
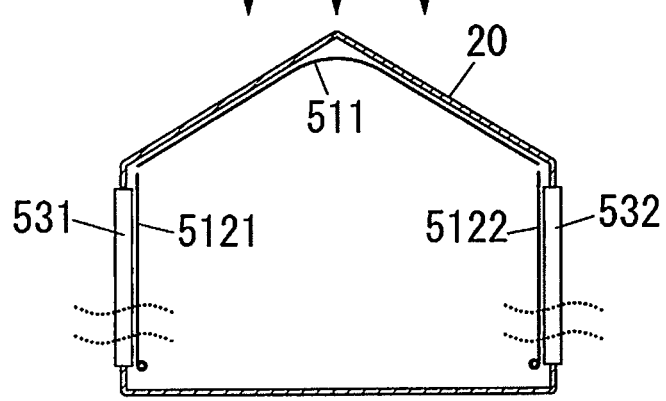
Figure 7C:
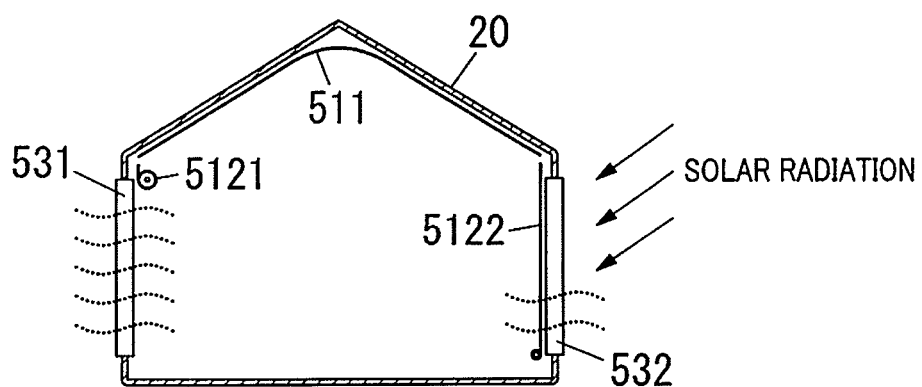

Further, as will be described in a second embodiment, the roof curtain 511, the first side curtain 5121, and the second side curtain 5122 are disposed on the greenhouse 20 (see FIGS. 7A to 7C). The curtains 51 are moved between the first position in which the amount of external light is reduced and the second position in which the amount of external light is not reduced. In the second position, the curtains are gathered so as to form gathered curtains.

Figure 5A:
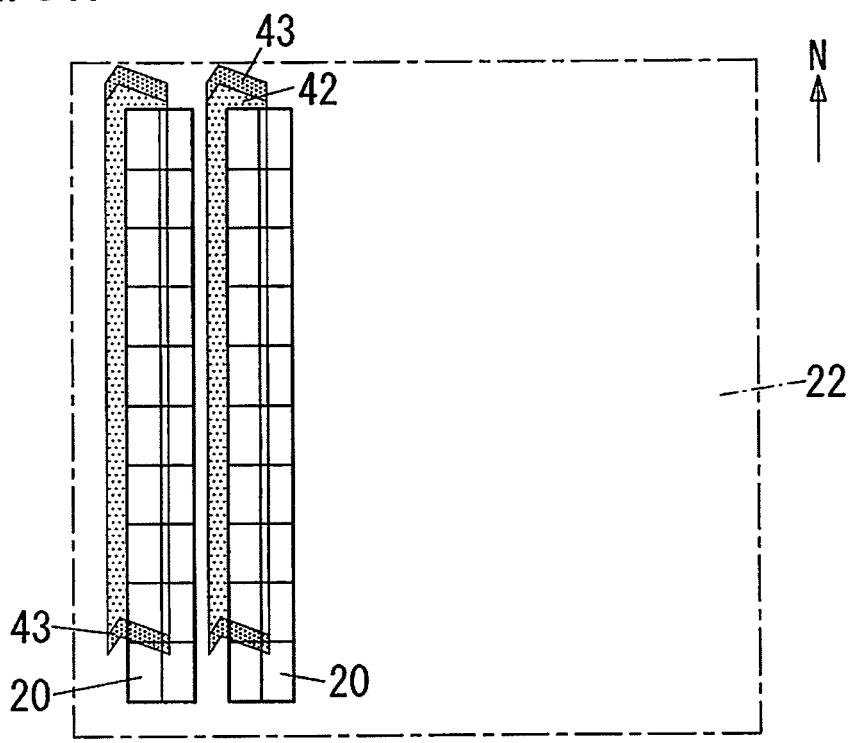
FIGS. 5A and 5B are views showing insolation of a plurality of greenhouses according to the first embodiment.
Figure 5B:
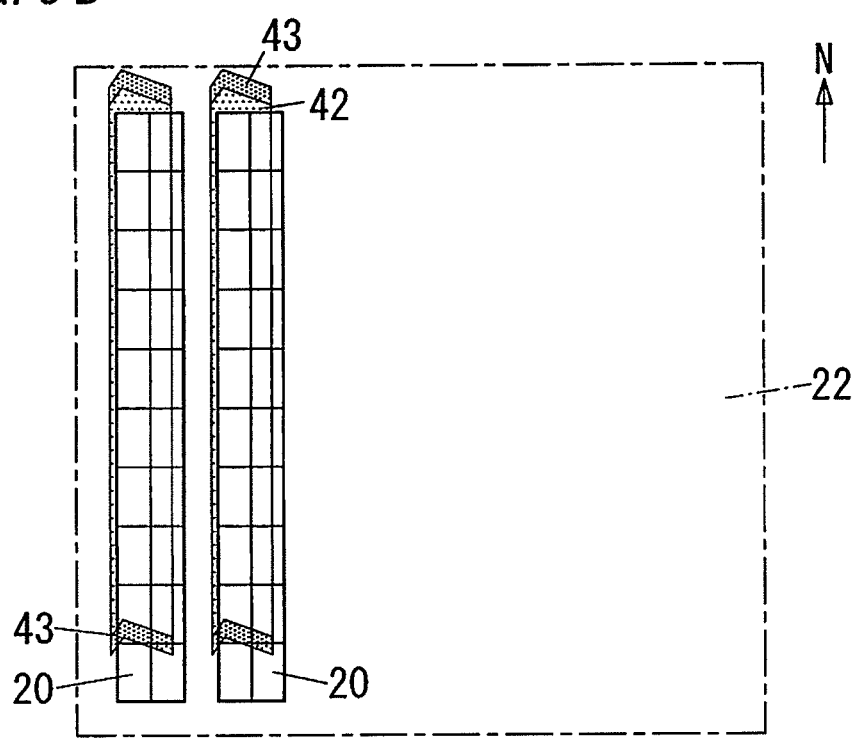

Therefore, as shown in FIGS. 5A and 5B, light transmitted through the greenhouse 20 is reduced when transmitted through the covering material of the greenhouse 20, and then emitted onto the surface of the plowed soil through the covering material of the adjacent greenhouse 20. FIGS. 5A and 5B show a region 42 irradiated with the light transmitted through the greenhouse 20, and the sun shadow 43 formed by the gathered curtains. Note that in FIGS. 5A and 5B, the upward orientation is a northward orientation.

Note that FIGS. 5A and 5B show a condition around the autumnal equinox, FIG. 5A showing the insolation at 10 am and FIG. 5B showing the insolation at 11 am. Hence, by having the insolation evaluation unit 12 determine the variation in the insolation amount by performing a computer simulation and having the presentation device 13 present the determined insolation amount to the user, the variation in the insolation amount according to the date and time can be shown to the user.

(Second Embodiment)

In the first embodiment, a technique of determining the disposition of the greenhouse 20 on the basis of the insolation amount in the planned location 22 by taking the insolation amount in the planned location 22 into account was described. A technique of controlling the amount of insolation received by the crop cultivated in the greenhouse 20 will be described below.

In this embodiment, as shown in FIG. 6, the insolation regulation apparatus 30 is provided in place of the installation evaluation apparatus 10. The insolation regulation apparatus 30 includes the input device 31, the insolation evaluation unit 32, and the control device 33. The insolation regulation apparatus 30 is realized by executing a program on a general-purpose computer. Note, however, that the insolation regulation apparatus 30 may be a dedicated apparatus. The program is provided via an electric communication line such as the Internet, or by a computer-readable storage medium.

In the example in the drawing, the input device 31 is provided integrally with the insolation regulation apparatus 30, but the input device 31 may be provided separately to the other constituent elements. For example, the input device 31 may be a terminal device as another computer device that is connected to an electric communication line so that the other constituent elements can communicate with the terminal device. The terminal device may be selected from a laptop personal computer, a smartphone, a tablet terminal, and so on. Further, the computer device may be selected from a Web server, a cloud computing system, and so on.

The environment regulation device 50 for controlling the cultivation environment of the crop is provided in the greenhouse 20. The environment regulation device 50 is provided with a configuration for regulating the insolation amount received by the crop, a configuration for regulating a temperature and a humidity on the periphery of the crop, and a configuration for regulating an amount of water applied to the crop. In this embodiment, the curtains 51 disposed in the interior space of the greenhouse 20 are used as the configuration for regulating the insolation amount. Further, the first window 531 and the second window 532 described in the first embodiment are used as the configuration for regulating the temperature and humidity on the periphery of the crop. The greenhouse 20 includes other configurations as the environment regulation device 50, but these configurations will not be described in this embodiment.

The curtains 51 are formed to reduce external light by approximately 30 to 50%. Further, the curtains 51 are moved between the first position in which the amount of external light emitted onto the crop is reduced and the second position in which the amount of external light emitted onto the crop is not reduced. The curtains 51 are moved by the driving device 52, which includes a motor.

The curtains 51 include the roof curtain 511 disposed over the roof 21, the first side curtain 5121 disposed over the first window 531, and the second side curtain 5122 disposed over the second window 532. The driving device 52 moves the roof curtain 511, the first side curtain 5121, and the second side curtain 5122 independently of each other. Here, the first window 531 and the second window 532 are opened and closed independently of each other by the opening/closing device 54.

The roof curtain 511 may be formed either to move along the gradient of the roof 21 or to move in the long axis direction of the greenhouse 20, but in this embodiment, the latter configuration is envisaged. In other words, the roof curtain 511 is formed by arranging two roof curtains 511 side by side in the long axis direction of the greenhouse 20. The roof curtain 511 is configured such that a position in which the two roof curtains 511 are closed corresponds to the first position and a position in which the two roof curtains 511 are drawn back to the respective long axis direction end portions of the greenhouse 20 corresponds to the second position. Further, the first side curtain 5121 and the second side curtain 5122 are constituted by roller blinds so that an unrolled position corresponds to the first position and a rolled position corresponds to the second position.

Operations of the driving device 52 and the opening/closing device 54 are controlled by the control device 33. The control device 33 notifies the driving device 52 of the timing at which to move the curtains 51 to the first position and the timing at which to move the curtains 51 to the second position.

The roof curtain 511 is used mainly to suppress an increase in the temperature on the periphery of the crop during summer. The control device 33 must therefore recognize summer in order to drive the roof curtain 511.

The control device 33 stores data associating sunrise and sunset times of each of a plurality of appropriately divided regions with the date and time, and learns the sunrise time and the sunset time by comparing the data with a date and time measured by an inbuilt clock (not shown) such as a real time clock. Japan, for example, may be divided into approximately eight regions. Here, a season in which the time between sunrise and sunset equals or exceeds a reference time is determined as summer. The reference time is set at thirteen hours, for example, but may be modified appropriately in accordance with the region. The control device 33 instructs the driving device 52 to move the roof curtain 511 to the first position during the season determined from the sunrise and sunset times to be summer.

Incidentally, the greenhouse 20 is disposed either such that the long axis direction corresponds to the north-south direction or so as to deviate by a comparatively small angle from the north-south direction. Here, when the first window 531 is provided on the east side and the second window 532 is provided on the west side, the first side curtain 5121 is positioned on the east side and the second side curtain 5122 is positioned on the west side.

To estimate the amount of insolation reaching the surface of the plowed soil in the greenhouse 20, the input device 31 includes a configuration for inputting the position information relating to the planned location 22 for installing the greenhouse 20. In other words, the input device 31 includes a display on which an input field for inputting the position information is displayed, and operating keys for inputting characters into the input field. The operating keys may be selected from a keyboard provided independently of the display, a touch panel superimposed onto a screen of the display, and so on, for example.

When a mobile terminal having an inbuilt GPS function, such as a smartphone or a tablet terminal, is used as the input device 31, the GPS function built into the mobile terminal can be operated in conjunction with the insolation regulation apparatus 30, and as a result, labor expended to input the position information can be eliminated. Furthermore, latitude and longitude data obtained by specifying the position using map data published on the Internet may be used by the insolation regulation apparatus 30. A similar technique to that of the input device 11 described in the first embodiment is used to obtain the position information relating to the planned location 22.

The insolation evaluation unit 32 determines variation, according to the date and time, in the insolation amount in the planned location 22 by performing a computer simulation using the position information relating to the planned location 22, which is input into the input device 31. The insolation evaluation unit 32 has similar basic functions to the insolation evaluation unit 12 described in the first embodiment. In other words, when the obstruction 40 (see FIGS. 2A and 2B) exists, the sun shadow 41 formed by the obstruction 40 is also taken into account. Further, when a plurality of greenhouses 20 are disposed, light transmitted through the adjacent greenhouse 20 is emitted onto the surface of the plowed soil, and therefore the insolation evaluation unit 32 corrects the insolation amount in accordance with the effect of the adjacent greenhouse 20.

As described above, the input device 31 functions similarly to the input device 11 according to the first embodiment, and the insolation evaluation unit 32 functions similarly to the insolation evaluation unit 12 according to the first embodiment. The control device 33 determines control content for obtaining a suitable insolation amount for cultivating the crop using the variation in the insolation amount according to the date and time, determined by the insolation evaluation unit 32.

When the plurality of greenhouses 20 are disposed side by side, as in the example shown in FIGS. 5A and 5B, and light transmitted through the adjacent greenhouse 20 is emitted onto the surface of the plowed soil, unevenness may occur in the amount of insolation received by the surface of the plowed soil due to the sun shadows 43 formed by the curtains 51. Hence, the control device 33 preferably controls the positions of the curtains 51 so that unevenness in the insolation amount due to the sun shadows 43 formed by the roof curtain 511, the first side curtain 5121, and the second side curtain 5122 is reduced.

The control executed by the control device 33 will be described below, using typical examples of summer and winter. Summer and winter may be distinguished using the time between sunrise and sunset. Note, however, that summer and winter may be identified using other information, for example information indicating variation in the outside air temperature.

In summer, the control device 33 issues instructions to the driving device 52 and the opening/closing device 54 in order to realize following conditions. More specifically, the roof curtain 511 is moved to the first position. Further, in a time slot prior to culmination and where the solar elevation is equal to or lower than the first reference angle, as shown in FIG. 7A, the first side curtain 5121 is moved to the first position and the second side curtain 5122 is moved to the second position. In a time slot following culmination and where the solar elevation is equal to or lower than the second reference angle, as shown in FIG. 7C, the first side curtain 5121 is moved to the second position and the second side curtain 5122 is moved to the first position. In a time slot where the solar elevation is between the first reference angle and the second reference angle, as shown in FIG. 7B, the first side curtain 5121 and the second side curtain 5122 are both moved to the first position. Furthermore, during summer, the first window 531 and the second window 532 are moved to the open position, as shown in FIGS. 7A to 7C.

The first reference angle is set on the basis of the solar elevation at around 10 am, for example. The second reference angle is set on the basis of the solar elevation at around 3 pm, for example. In other words, in a time slot where sunlight entering through the first window 531 is emitted onto the surface of the plowed soil, the amount of light is reduced by moving the first side curtain 5121 to the first position. Further, in a time slot where sunlight entering through the second window 532 is emitted onto the surface of the plowed soil, the amount of light is reduced by moving the second side curtain 5122 to the first position. In other time slots, the first side curtain 5121 and the second side curtain 5122 are moved to the second position. During daytime, an increase in the temperature on the periphery of the crop is suppressed by moving the first side curtain 5121 and the second side curtain 5122 to the second position.

Figure 8A:
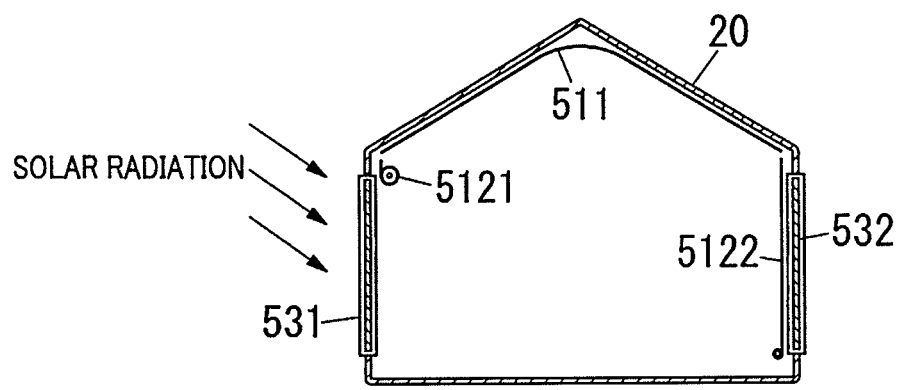
FIGS. 8A and 8B are views showing an example operation of the second embodiment.
Figure 8B:
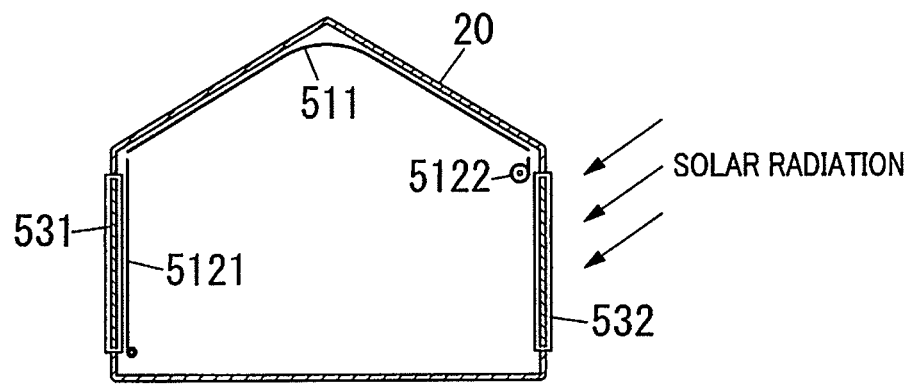

In winter, meanwhile, the control device 33 issues instructions to the driving device 52 and the opening/closing device 54 in order to realize following conditions. More specifically, the roof curtain 511 is moved to the second position as a rule. Further, in a time slot prior to culmination and where the solar elevation is equal to or lower than the third reference angle, as shown in FIG. 8A, the first side curtain 5121 is moved to the second position and the second side curtain 5122 is moved to the first position. In a time slot following culmination and where the solar elevation is equal to or lower than the fourth reference angle, as shown in FIG. 8B, the first side curtain 5121 is moved to the first position and the second side curtain 5122 is moved to the second position. Furthermore, during winter, the first window 531 and the second window 532 are moved to the closed position, as shown in FIGS. 8A and 8B.

The third reference angle is set on the basis of the solar elevation at around 10 am, for example. The fourth reference angle is set on the basis of the solar elevation at around 3 pm, for example. In other words, in a time slot where sunlight entering through the first window 531 is emitted onto the surface of the plowed soil, an increase in the temperature on the periphery of the crop is promoted by moving the first side curtain 5121 to the second position. Further, in a time slot where sunlight entering through the second window 532 is emitted onto the surface of the plowed soil, an increase in the temperature on the periphery of the crop is promoted by moving the second side curtain 5122 to the second position. In other time slots, the first side curtain 5121 and the second side curtain 5122 are moved appropriately so that the daytime temperature on the periphery of the crop is maintained at an appropriate temperature. Note that other configurations and operations are similar to the first embodiment.

Third Embodiment

Figure 10:
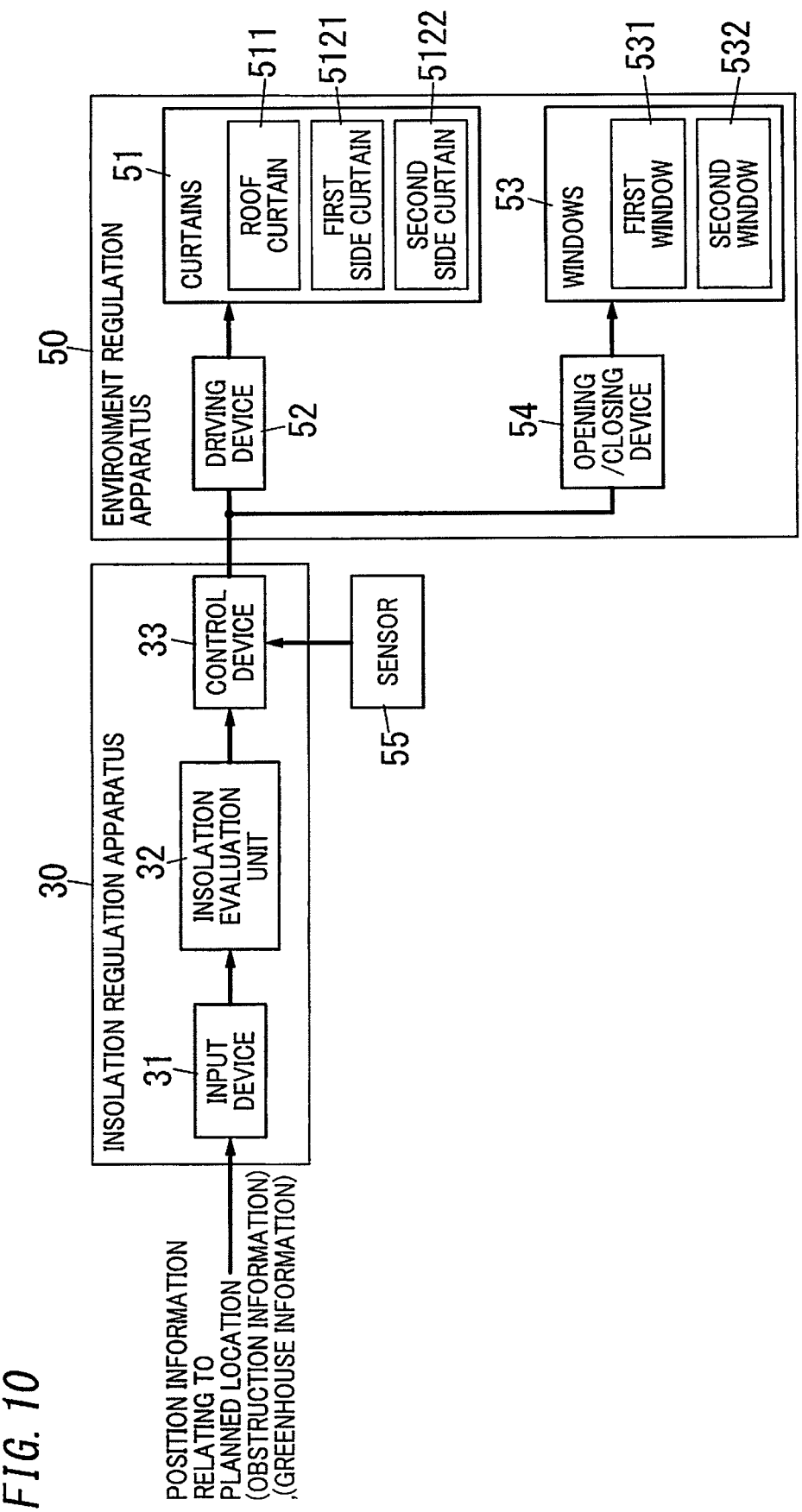
FIG. 10 is a block diagram showing an example of a use of the third embodiment.

In the second embodiment, temporal variation in the insolation amount, which is determined by simulation, is used as the information used to control the environment regulation device 50 provided in the greenhouse 20. As shown in FIG. 10, to control the environment regulation device 50 with a higher degree of precision, the sensor 55 is preferably provided to monitor the environment of the greenhouse 20 (the cultivation environment of the crop), and information monitored by the sensor 55 is also used during the control.

The sensor 55 that monitors the environment of the greenhouse 20 includes a temperature sensor, a humidity sensor, a soil moisture sensor, and so on. The humidity sensor is configured to measure a relative humidity, and when a combined sensor combining a temperature sensor and a humidity sensor is used, the temperature and the humidity in a single location can be measured simultaneously, with the result that the relative humidity can be measured with a high degree of precision. The soil moisture sensor is a sensor that monitors a moisture content of the soil. At least one type of sensor selected from these sensors 55 is preferably used to control the environment regulation device 50. The temperature, the humidity, and the moisture content of the soil correlate with the integrated value of the insolation amount, and therefore, by considering the location in which the sensor 55 used to monitor the environment is disposed on the basis of the insolation amount, the environment regulation device 50 can be controlled with a high degree of precision. Note that if necessary, a wind speed sensor, a $CO_2$ sensor that measures a carbon dioxide concentration, and so on may also be used as the sensor 55.

As described in the second embodiment, the environment regulation device 50 includes the curtains 51 (the roof curtain 511, the first side curtain 5121, the second side curtain 5122, and so on), the first window 531, the second window 532, and so on. The environment regulation device 50 also includes a sprinkler device, a mist generating device, and so on. These environment regulation devices 50 contribute to regulation of the temperature and humidity. Further, the sprinkler device is controlled in accordance with the moisture content of the soil.

When the sensor 55 is disposed in the greenhouse 20 or the planned location 22, the environment may vary depending on the location. Depending on the installation location of the sensor 55, therefore, it may be impossible to obtain useful information for controlling the environment of the greenhouse 20 from the sensor 55. In other words, the installation location of the sensor 55 must also be selected on the basis of a reference. In consideration of these circumstances, this embodiment provides a technique for extracting a suitable installation location for the sensor 55 on the basis of the variation in the insolation amount according to the date and time, determined by the insolation evaluation unit 12.

Figure 9:
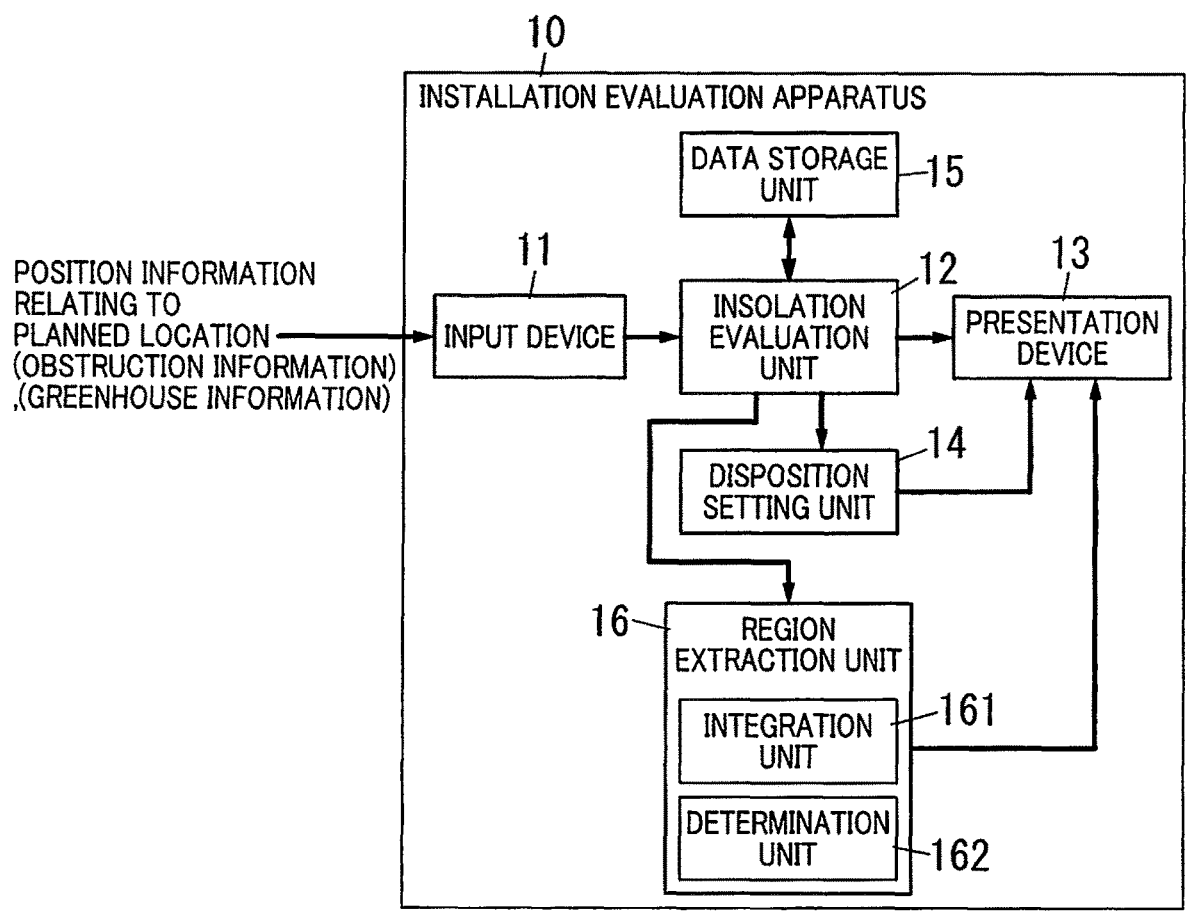
FIG. 9 is a block diagram showing a third embodiment.

Incidentally, in the first embodiment, the disposition setting unit 14 is provided to determine a candidate disposition and candidate dimensions of the greenhouse 20 using the variation in the insolation amount according to the date and time, determined by the insolation evaluation unit 12. In other words, the disposition setting unit 14 has a dedicated function for determining the disposition and dimensions of the greenhouse 20. In this embodiment, however, as shown in FIG. 9, the region extraction unit 16 is provided to extract a region in which the insolation amount satisfies a determination condition using the variation in the insolation amount according to the date and time, determined by the insolation evaluation unit 12. In other words, the region extraction unit 16 extracts a region of the planned location 22 in which the insolation amount satisfies the determination condition. A technique for extracting a region serving as a candidate installation location for the sensor 55 using the region extraction unit 16 will be described below. Note that the region extracted by the region extraction unit 16 is visualized and presented by the presentation device 13.

The region extraction unit 16 includes the integration unit 161 that determines an integrated value of the amount of insolation received by the planned location 22 over a specific period. More specifically, the integration unit 161 divides the planned location 22 into a plurality of regions, and determines an integrated value of the insolation amount over the specific period for each region. The specific period is preferably constituted by units of a single day, for example one day or a plurality of days such as one week. Further, when the specific period includes a plurality of days, an average value of a single day may be determined from the integrated value of the specific period instead of using the integrated value of the entire period. By setting the specific period at a plurality of days in this manner, a monthly insolation amount, for example, including variation in weather conditions can be estimated.

To extract the installation location of the sensor 55 using the integrated value of the insolation amount, determined by the integration unit 161, the region extraction unit 16 includes the determination unit 162 for determining whether or not the integrated value of the insolation amount is within a reference range. In other words, the determination unit 162 uses a determination condition that is satisfied when the integrated value of the insolation amount is within a reference range set in order to extract the installation location of the sensor 55 used to monitor the environment of the greenhouse 20. The determination unit 162 then extracts a region in which the integrated value of the insolation amount satisfies the determination condition from the plurality of regions as the region serving as the candidate installation location of the sensor 55. The region serving as the candidate installation location of the sensor 55, extracted by the determination unit 162, is then presented by the presentation device 13. Note that the reference range is stored in advance in the data storage unit 15.

Incidentally, the reference range preferably varies from season to season. The reason for this is that during winter, when the integrated value of the insolation amount over one day is small, the temperature rises slowly in the morning and falls rapidly in the evening, whereas in the summer, when the integrated value of the insolation amount over one day is large, the temperature rises rapidly in the morning and falls slowly in the evening. In winter, in consideration of unevenness in crop growth, the sensor 55 is preferably disposed in a location of the planned location 22 where an average integrated value of the insolation amount is obtained. In summer, the crop may not grow due to high temperatures in locations where the integrated value of the insolation amount is large, and therefore the sensor 55 is preferably disposed so that countermeasures can be taken as early as possible. It may therefore be said that the reference range used to select the installation location of the sensor 55 is preferably varied between a season in which the insolation amount per unit time is large and a season in which the insolation amount per unit time is small.

Accordingly, the determination unit 162 sets an upper limit value and a lower limit value in relation to the insolation amount. The determination unit 162 then determines a season in which a maximum value of the insolation amount in the planned location 22 equals or exceeds the upper limit value to be summer, and determines a season in which a minimum value of the insolation amount in the planned location 22 is equal to or smaller than the lower limit value to be winter. Note that the condition for determining summer may be a season in which the minimum value of the insolation amount equals or exceeds the upper limit value, and the condition for determining winter may be a season in which the maximum value of the insolation amount is equal to or smaller than the lower limit value. Alternatively, the determination unit 162 may determine the season by comparing an average value per unit time (thirty minutes, one hour, or the like, for example) determined from the integrated value of the insolation amount over a single day with the upper limit value and the lower limit value. Furthermore, the season may be divided into three or more stages rather than only two stages. In this case, three or more reference ranges are stored in advance in the data storage unit 15 rather than only the summer reference range and the winter reference range.

Here, the insolation amount per season may be predicted on the basis of a geographical position of the planned location 22, but depending on the condition of the obstruction 40 (see FIGS. 2A and 2B) existing on the periphery of the planned location 22, the insolation amount in the planned location 22 may not necessarily correspond to the season. To achieve the aims of this embodiment, therefore, the season is preferably divided on the basis of the insolation amount, as described above.

During a season in which the insolation amount equals or exceeds the upper limit value, the determination unit 162 sets the reference range at a range equaling or exceeding a representative value determined from the integrated value of the insolation amount in the planned location 22. During a season in which the insolation amount is equal to or smaller than the lower limit value, on the other hand, the determination unit 162 sets the reference range at a range no lower than the representative value determined from the integrated value of the insolation amount in the planned location 22. The representative value determined from the integrated value of the insolation amount may be selected from an average value, a median value, a mode value, or the like of the integrated insolation amount over the period. Note that another value calculated using an appropriate function may be used as the representative value instead of the values cited above.

As described above, the candidate region in which to dispose the sensor 55 is a region of the planned location 22 exhibiting unfavorable conditions as an environment for cultivating the crop. Therefore, by controlling the environment regulation device 50 on the basis of the environment monitored by the sensor 55 disposed in this region, the environment regulation device 50 can maintain a favorable environment for cultivating the crop in other regions.

In the example configuration described above, the candidate region in which to install the sensor 55 is selected by comparing the integrated value of the insolation amount with the reference range. Alternatively, the reference range may be set such that an unsuitable candidate region can be extracted as the installation location of the sensor 55. For example, during summer, a region in which the integrated value of the insolation amount is equal to or smaller than the representative value may be set as a candidate region in which the sensor 55 cannot be disposed, and during winter, a region in which the integrated value of the insolation amount equals or exceeds the representative value may be set as a candidate region in which the sensor 55 cannot be disposed.

Incidentally, when a plurality of greenhouses 20 (approximately ten greenhouses 20, for example) are disposed in the planned location 22, a single sensor 55 that is shared by the plurality of greenhouses 20 is preferably disposed. Particularly since the greenhouses 20 are provided with the curtains 51 and so on for adjusting the amount of insolation received by the crop, the sensor 55 for monitoring the insolation amount must be disposed on the exterior of the greenhouse 20. In other words, a sensor 55 for monitoring an external environment of the greenhouse 20 preferably includes an illuminance sensor or a solar radiation sensor so as to be capable of measuring the insolation amount in the planned location 22. The sensor 55 may also include at least one type of sensor selected from a group including a temperature sensor and a humidity sensor.

As regards the installation location of the sensor 55 that monitors the external environment of the greenhouse 20, similarly to the example configuration described above, the determination unit 162 preferably extracts a candidate region using a set reference range as the determination condition. In other words, this type of sensor 55 is preferably disposed in a region where the integrated value of the insolation amount takes a maximum value, regardless of the season. Hence, during a season in which the insolation amount equals or exceeds a preset upper limit value, the determination unit 162 preferably sets the reference range at a range that equals or exceeds a representative value determined from the integrated value in the planned location 22. All other configurations and operations of this embodiment are similar to the first embodiment or the second embodiment.

The embodiments described above are merely examples of the present invention. Hence, the present invention is not limited to the above embodiments, and various modifications may be implemented on the embodiments in accordance with designs and so on within a scope that does not depart from the technical spirit of the present invention.

The invention claimed is:

1. An installation evaluation apparatus for a greenhouse, comprising:
   an input device into which position information relating to a planned location for installing the greenhouse is input;
   an insolation evaluation unit that determines variation, according to a date and time, in an insolation amount in the planned location by performing a computer simulation using the position information input into the input device;
   a presentation device that visualizes and presents the variation in the insolation amount according to the date and time, determined by the insolation evaluation unit; and
   a region extraction unit that extracts a region, in which the insolation amount satisfies a determination condition, using the variation in the insolation amount according to the date and time, determined by the insolation evaluation unit,
   wherein the presentation device is configured to visualize and present the region extracted by the region extraction unit.

2. The installation evaluation apparatus for a greenhouse according to claim 1, wherein the input device is configured to receive input of a position and dimensions of an obstruction that exists on a periphery of the planned location and that may therefore form a sun shadow on the planned location, in addition to the position information relating to the planned location, and the insolation evaluation unit is configured to determine the variation, according to the date and time, in the insolation amount in the planned location using the position and the dimensions of the obstruction in addition to the position information.

3. The installation evaluation apparatus for a greenhouse according to claim 1, further comprising a disposition setting unit that determines a candidate disposition and candidate dimensions of the greenhouse for obtaining a desired insolation amount using the variation in the insolation amount according to the date and time, determined by the insolation evaluation unit, wherein the presentation device is configured to visualize and present the candidate disposition and the candidate dimensions of the greenhouse, determined by the disposition setting unit.

4. The installation evaluation apparatus for a greenhouse according to claim 3, wherein the disposition setting unit is configured to determine the candidate disposition and the candidate dimensions of the greenhouse based on a type of crop to be cultivated in the greenhouse in addition to the variation in the insolation amount according to the date and time so that a suitable insolation amount for the crop is obtained.

5. The installation evaluation apparatus for a greenhouse according to claim 3, wherein the input device is configured to receive also input of a number of greenhouses installed in the planned location, and when the greenhouse is installed in a plurality, the disposition setting unit is configured to determine an interval between greenhouses automatically.

6. The installation evaluation apparatus for a greenhouse according to claim 1, wherein the region extraction unit comprises:

an integration unit that determines an integrated value of the insolation amount in the planned location over a specific period; and a determination unit that extracts a region serving as a candidate installation location of a sensor that monitors an environment of the greenhouse using the determination condition, the determination condition being satisfied when the integrated value is within a reference range set in order to extract the installation location of the sensor.

7. The installation evaluation apparatus for a greenhouse according to claim 6, wherein the determination unit is configured to determine the reference range based on the insolation amount.

8. The installation evaluation apparatus for a greenhouse according to claim 7, wherein during a season in which the insolation amount equals or exceeds a preset upper limit value, the determination unit is configured to set a range equaling or exceeding a representative value determined from the integrated value in the planned location as the reference range.

9. The installation evaluation apparatus for a greenhouse according to claim 7, wherein during a season in which the insolation amount is equal to or smaller than a preset lower limit value, the determination unit is configured to set a range not lower than a representative value determined from the integrated value in the planned location as the reference range.

10. The installation evaluation apparatus for a greenhouse according to claim 6, wherein the sensor includes at least one type of sensor selected from a group including a temperature sensor, a humidity sensor, and a soil moisture sensor.

11. The installation evaluation apparatus for a greenhouse according to claim 1, wherein the region extraction unit comprises:

an integration unit that determines an integrated value of the insolation amount in the planned location over a specific period; and a determination unit that extracts a region serving as a candidate installation location of a sensor that monitors an external environment of the greenhouse in the planned location using the determination condition, the determination condition being satisfied when the integrated value is within a reference range set in order to extract the installation location of the sensor.

12. The installation evaluation apparatus for a greenhouse according to claim 11, wherein during a season in which the insolation amount equals or exceeds a preset upper limit value, the determination unit is configured to set a range equaling or exceeding a representative value determined from the integrated value in the planned location as the reference range.

13. The installation evaluation apparatus for a greenhouse according to claim 11, wherein the sensor includes an illuminance sensor or a solar radiation sensor.

14. An insolation regulation apparatus for a greenhouse, comprising:

an input device into which position information relating to a planned location for installing the greenhouse is input;

an insolation evaluation unit that determines variation, according to a date and time, in an insolation amount in the planned location by performing a computer simulation using the position information input into the input device;

a control device that controls an operation of an environment regulation device that regulates a cultivation environment of a crop in the greenhouse;

a presentation device that visualizes and presents the variation in the insolation amount according to the date and time, determined by the insolation evaluation unit; and a region extraction unit that extracts a region, in which the insolation amount satisfies a determination condition, using the variation in the insolation amount according to the date and time, determined by the insolation evaluation unit, wherein the control device determines control content for obtaining a suitable insolation amount for cultivating the crop using the variation in the insolation amount according to the date and time, determined by the insolation evaluation unit, and wherein the presentation device is configured to visualize and present the region extracted by the region extraction unit.

15. The insolation regulation apparatus for a greenhouse according to claim 14, wherein the input device is configured to receive input of a position and dimensions of an obstruction that exists on a periphery of the planned location and that may therefore form a sun shadow on the planned location, in addition to the position information relating to the planned location, and the insolation evaluation unit is configured to determine the variation, according to the date and time, in the insolation amount in the planned location using the position and the dimensions of the obstruction in addition to the position information.

16. The insolation regulation apparatus for a greenhouse according to claim 15, wherein the environment regulation device comprises:

a curtain capable of moving between a first position in which an amount of external light emitted onto the crop is reduced and a second position in which the amount of external light emitted onto the crop is not reduced; and a driving device for moving the curtain, wherein the control device is configured to notify the driving device of a timing at which the curtain is moved to the first position and a timing at which the curtain is moved to the second position.

17. The insolation regulation apparatus for a greenhouse according to claim 16, wherein the curtain includes a roof curtain provided on a roof of the greenhouse, and the control device is configured to instruct the driving device to move the roof curtain so as to be kept at the first position during a season in which a time between sunrise and sunset equals or exceeds a predetermined reference time.

18. The insolation regulation apparatus for a greenhouse according to claim 16, wherein the environment regulation device comprises:

a first window provided on an east-side side wall of the greenhouse and a second window provided on a west-side side wall of the greenhouse; and an opening/closing device that drives the first window and the second window between an open position and a closed position, and the curtain includes a first side curtain provided on the east-side side wall of the greenhouse and a second side curtain provided on the west-side side wall of the greenhouse.

19. The insolation regulation apparatus for a greenhouse according to claim 18, wherein the control device is configured to: instruct the opening/closing device to move the first window and the second window to the open position in summer;

instruct the driving device to move the first side curtain to the first position and move the second side curtain to the second position in a time slot prior to culmination and where a solar elevation is equal to or lower than a first reference angle;

instruct the driving device to move the first side curtain to the second position and move the second side curtain to the first position in a time slot following culmination and where the solar elevation is equal to or lower than a second reference angle; and instruct the driving device to move both the first side curtain and the second side curtain to the first position in a time slot where the solar elevation is between the first reference angle and the second reference angle.

20. The insolation regulation apparatus for a greenhouse according to claim 18, wherein the control device is configured to: instruct the opening/closing device to move the first window and the second window to the closed position in winter;

instruct the driving device to move the first side curtain to the second position and move the second side curtain to the first position in a time slot prior to culmination and where the solar elevation is equal to or lower than a third reference angle; and instruct the driving device to move the first side curtain to the first position and move the second side curtain to the second position in a time slot following culmination and where the solar elevation is equal to or lower than a fourth reference angle.

* * * * *